Dec. 27, 1927.
F. M. BLAKE
1,654,450
SAFETY APPLIANCE FOR MOTOR VEHICLES
Filed June 16, 1922
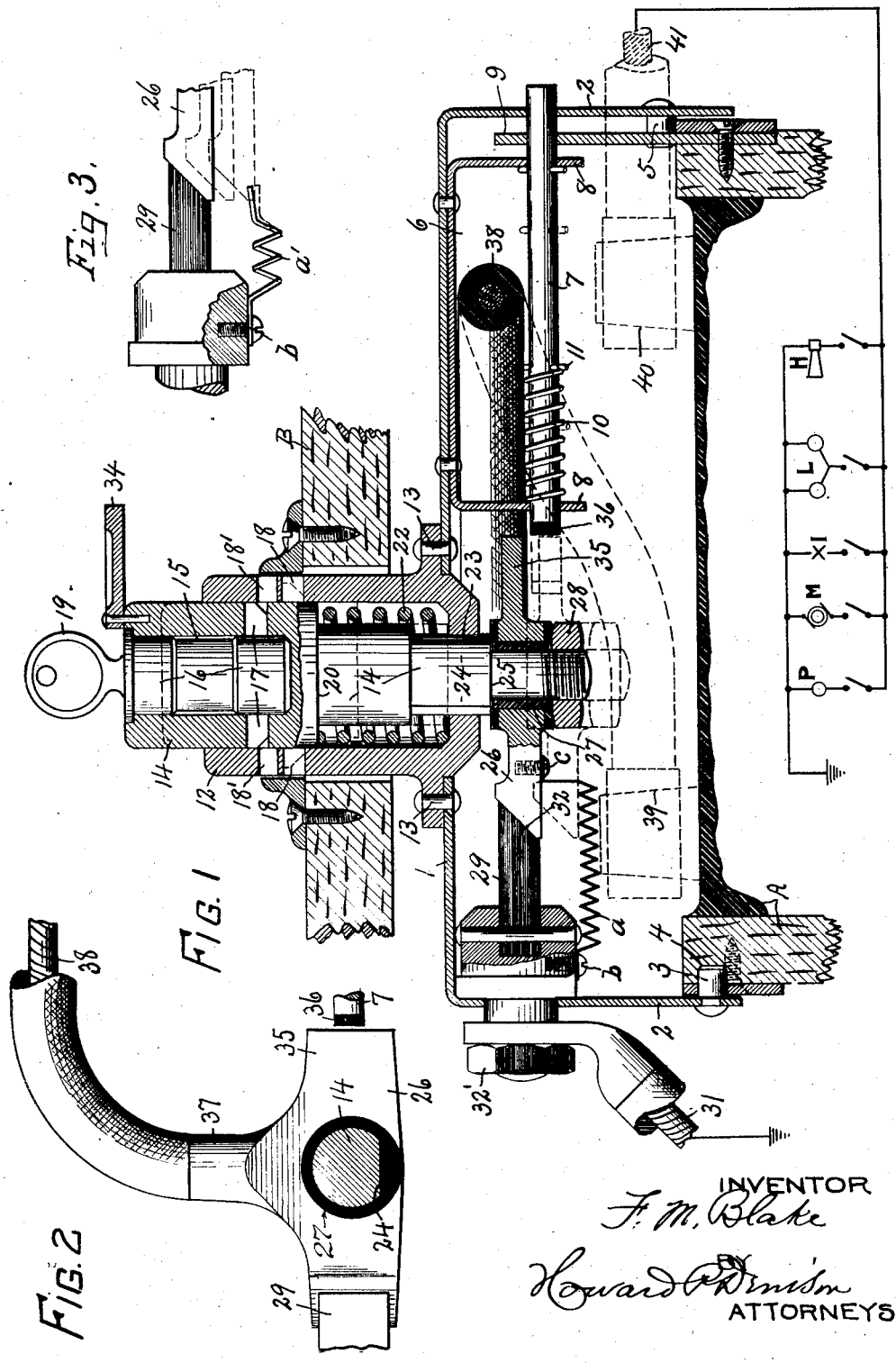
INVENTOR
F. M. Blake
Howard P. Denison
ATTORNEYS.

Patented Dec. 27, 1927.

1,654,450

UNITED STATES PATENT OFFICE.

FRED M. BLAKE, OF FULTON, NEW YORK.

SAFETY APPLIANCE FOR MOTOR VEHICLES.

Application filed June 16, 1922. Serial No. 568,681.

This invention relates to a safety appliance for motor vehicles of the class set forth in my pending application Serial #517,096 filed November 22, 1921, and also in my Patents #1,527,624 and #1,527,625, Feb. 24, 1925, in that the main object is to enable all of the electric storage battery circuits and translating devices commonly used in motor vehicles and shown diagrammatically in my Patent #1,527,625 to be cut out by the operation of an electric switch connected in the grounded side of the storage battery and to cause said switch to be automatically locked in its open position so that it cannot be closed except by the manipulation of a special key.

While this main object is successfully carried out by the construction shown in the pending application referred to and is highly useful in reducing the liability of fires from short circuits, theft of the machine and current leakages at any time when the machine is parked or housed, I have found that it is desirable to make some provision for parking-lights at night, and the specific object of the present invention is to provide an electrical resistance attachment by which when the switch is opened to render the several circuits inoperative for the purposes intended, as for example, in preventing the operation of the starting motor, ignition horn and driving lights, it will cut in an electrical resistance of sufficiently high value to prevent the operation of those parts and at the same time low enough to by-pass a sufficient current for the parking light.

Other objects and uses will be brought out in the following description:

In the drawings:

Fig. 1 is a sectional view, partly in elevation of a safety appliance operatively connected to a storage battery, a portion of which is also shown together with a diagrammatic view of several translating devices commonly used in motor vehicles.

Fig. 2 is the top plan view of the movable switch terminal and its supporting rod together with the adjacent ends of the companion terminal and locking bar for the battery cover.

Fig. 3 is a side elevation, partly in section of the adjacent ends of the switch terminals showing a modified form of by-pass.

As illustrated, this safety appliance comprises a sheet metal cover plate —1— of sufficient size to entirely cover the top of the storage battery —A— and is provided with a down-turn marginal flange —2— having at one side one or more lugs —3— adapted to enter a socket —4— in the adjacent side of the battery case just below the upper edge thereof, the opposite side of the cover plate being provided with one or more lugs —5— adapted to rest upon the upper edge of the corresponding side of the battery case and together with the lug or lugs —3— constitute means for supporting the cover plate removably upon the top of the battery with the upper horizontal portion of the cover plate a sufficient distance above the battery terminals to avoid contact therewith and to form an intervening chamber —6— for the reception and protection of the terminal connections and various parts of the safety appliance presently described.

A locking bolt —7— is slidable horizontally in suitable guide flanges —8— depending from the top of the cover plate —1— within the chamber —6— and is movable into and out of engagement with a relatively fixed keeper plate —9— on one side of the storage battery —A—, the outer end of said locking bolt being projected through an opening in the corresponding side of the cover plate where it is available for operation by hand or by a suitable implement against the action of a retracting spring —10— to release it from engagement of the keeper —9— when it is desired to release the cover, the keeper plate —9— being located at the same side of the battery as the lug —5— which engages the upper edge of a battery case so that when the locking bolt —7— is released, the adjacent side of the cover may be lifted upwardly above the battery case and then the entire plate moved sidewise to disengage the lugs —3— from the opposite side of the battery case, thereby detaching the cover plate from the battery to permit access to the interior of the cover and to the top of the battery when desired.

By reversing the operation just described, the cover may be restored to its closed position and locked in place by the lugs —3— and locking bolt —7— which latter is yieldingly held in its locked position by the spring —10— having one end bearing against a shoulder —11— on the bolt as shown in Fig. 1.

A tubular post —12— is secured at its lower end in an opening in the top of the cover plate —1— by rivets —13— or equivalent fastening means to project upwardly through an opening in a floor board —B— which forms a removable part of the floor of the car, preferably directly in front of the driver's seat and some distance above the battery —A— and its cover plate —1—.

A cylindrical plunger —14— is movable vertically in the tubular post —12— and is provided in its upper end with a cylindrical chamber or socket —15— open at the top for receiving a cylinder lock —16— having lockbolts —17—, which are movable in radial openings in the plunger —16— and are spring pressed outwardly for automatically engaging in openings —18— in corresponding sides of the post —12— when registered therewith but are adapted to be withdrawn from said openings —18— by a key —19— inserted in the upper end of the lock —16—.

The lower end of the plunger —14— is reduced in diameter to form a shoulder —20—, while the chamber in the lower end of the post —12— is also reduced in diameter to form a seat for the lower end of a coil spring —22— which surrounds the lower reduced portion of the plunger —14— and has its upper end engaged with the shoulder —20— for normally elevating the plunger and thereby normally holding the locking member —17— out of registration with or above the keeper openings —18— by bearing against the inner surface of the post —12—.

The lower reduced end of the plunger —14— extends through an opening —23— in the bottom of the post —12— and is provided with a flattened side —24— Figure 2 engaging a corresponding flattened side of the opening —23— to prevent turning of the plunger and thereby to keep the locking member —17— in vertical alinement with the keeper opening —18—.

The extreme lower end of the plunger —14— below the bottom of the post —12— is further reduced to form a shoulder —25— and is adapted to receive an electric switch member —26—, which is insulated from the adjacent portion of the plunger by insulation —27— and is held in fixed relation to said post by a clamping nut —28— engaging the lower threaded end of the plunger.

A relatively fixed laminated switch member —29— is secured at one end to a binding post, which extends through an opening in the adjacent side of the cover plate —1— for receiving a return conductor —31—, the latter being clamped to the binding post by means of a nut —32'— to form an electric connection therewith and is preferably grounded on the frame of the machine.

The switch member —26— is movable into and out of contact with the relatively fixed switch member —29— and their contacting faces are beveled at —32—, respectively, to cause the beveled face of the switch member —26— to engage the beveled face of the switch member —29— with an upward wiping contact which, owing to the resiliency of the free ends of the lamina of the switch member —29—, assures a more perfect electrical connection between the two members and tends to keep the contacting surfaces clean.

That is, the switch member —26— is opened or separated from contact with the switch member —29— by downward pressure of the foot upon the upper end of the plunger —14— against the action of the spring —22— until locked in its open position by the engagement of the locking bolts —17— in the openings —18— in the post —12—, it being understood that before this downward pressure upon the upper end of the foot, the key —19— will be removed and the upper end of the lock closed by a swinging cap —34— so that the foot pressure is actually upon the upper surface of the cap which is a part of and moves with the plunger —14—.

The switch member —26— is provided with a radially extending heel piece —35— which is normally above the plane of movement of the cover locking bolt —7— when the switch is closed but is movable into registration with the inner end of said locking bolt as shown by dotted lines in Fig. 1 when the switch member —26— and its operating plunger —14— are locked in their down or open positions, thereby locking the bolt —7— against inward movement and preventing the removal of the cover plate —1— from the battery and also preventing access to the battery terminals and other parts enclosed by the cover plate to further protect the machine against theft or malicious interference with the electrically controlled working parts of the machine, the inner end of the plunger —7— being provided with an insulating tip —36— to avoid any possibility of leakage of the current from the battery to the cover plate —1—.

The switch member —26— is also provided with a laterally projecting boss —37— Figure 2 to which is secured one end of a conductor —38— having its other end electrically connected to the return terminal as —39— of the battery as shown by dotted lines in Figure 1. The conductor —38— and switch members —26— and —29— form parts of the ground connection between the battery terminal —39— and grounded conductor —31— when the switch member —26— is closed, the other battery terminal as —40— being connected by current supply cable —41— to suitable controllers, not shown, for the several translating devices not necessary to herein illustrate or describe.

The operation briefly described is as follows:

Assuming that the key —19— is withdrawn and that the cap —34— and switch member —26— are in their closed position with the plunger —14— in its uppermost position as determined by the contact of the switch member —26— with the switch member —29— and that the occupant of the car is about to leave the same. Then in passing out of the car, the operator simply steps on the upper end of the plunger —14— with sufficient pressure to depress the plunger and thereby to open the switch member —26— and allow the locking members —17— to spring into the openings —18—, thus locking the switch member —26— and its operating plunger —14— in their down or open positions against the action of the spring —22— and also registering the heel —35— of the switch member —26— with the inner end of the locking bolt —7— for the cover plate —1—.

By this operation, the grounded side of the battery circuit is broken or open and at the same time, the bolt —7— is held in its locking position to hold the cover plate —1— on the top of the battery, thereby positively cutting out all of the circuits leading to the several translating devices, and at the same time locking the cover plate in its closed position to further reduce the possibility of theft or malicious interference with the battery connections in addition to the reduced liability of fires or leakages by short circuits.

When the driver of the car returns, it is simply necessary to swing the cap —34— to one side and then to insert the key into the lock to withdraw the locking bolts —17— from the openings —18— whereupon the spring —22— will instantly force the plunger —14— and switch member —26— carried thereby upwardly to restore contact or electrical connection between the switch members —26— and —29— after which the key —19— may be withdrawn and the cap —34— restored to its closed position.

An electrical resistance by-pass —a— is electrically connected by a screw —b— to one of the switch terminals as —29— and has its other end electrically connected by screw —c— to the movable terminal —26—, the resistance being flexible to permit relative opening and closing movement of the switch terminal —26— without breaking its connection with either terminal.

In Fig. 3. I have shown a resistance by-pass —a'— as attached at one end by a screw —b'— to the fixed terminal as —29— of the switch, while the other end is free from attachment but lies in the path of movement of the movable terminal —26— so as to break the connection with the by-pass when the movable switch is closed and to make connection therewith when the switch is open, in which case, the switch member —26— might be opened a limited distance sufficient to cut out the several circuits without cutting in the resistance —a'— and for this purpose, I have shown the post —12— as provided with an extra set of openings —18'— just above the openings —18— but below the normal position of the locking bolts —17— when the switch member —26— is closed.

That is, the normal space between the switch member —26— and free end of the resistance member —a'— is slightly less than the amount of movement of the switch member —26— from its closed position to its extreme open position when the locking members —17— are engaged in the openings —18— and therefore, the openings —18'— provide means for locking the switch member —26— in an intermediate position out of contact with the switch member —29— and free end of the resistance member —a'—, the extreme position and intermediate position of the switch member —26— being shown by dotted lines in Fig. 3. The translating devices shown diagrammatically in Figure 1 comprise a horn H, headlights L, ignition I, starting motor M, and parking light or tail light P.

When the switch is closed the potential of the battery current is sufficient to operate any one or all of the translating devices, the resistance —a— or —a'— being then short circuited. The amount of resistance in each of the elements —a— or —a'— is sufficient when the switch is opened to reduce the potential in all of the translating devices to an extent sufficient to render all of said translating devices, except the parking light P, inoperative and at the same time to maintain a sufficient glow in the parking light for parking purposes, it being understood that the parking light installed will be capable of producing the necessary parking glow under the low potential produced by the cutting-in of the resistance.

By this arrangement the circuits may be entirely cut out when the car is parked or housed in the day time or housed at night by simply depressing the plunger —14— part way down or until its locking members —17— enter the openings —18'— but if the car is to be parked at night on the street or where lights are required, the plunger may be further depressed until its locking members —17— enter the lower openings —18—, whereupon the resistance member —a'— will be cut into the circuit to produce sufficient energy for the parking lights but not sufficient for full lights or for starting the motor or operating the horn. In either case the electric switch and its by-pass resistance —a— constitute parts of an electric control system in which the resistance is so proportioned as to effect the operation of a parking light when its individual switch is closed and to be ineffective for the operation of the starting motor ignition, horn and driving lights when anyone or all of the individual switches for those parts are closed.

What I claim is:

In a safety appliance for motor vehicles having a source of electric energy, a starting motor and an electric lamp, both deriving current from said source, separate controlling devices for the motor and lamp operable at will, in combination with a single electric switch controlling the starting motor and lamp circuits independently of the first-named controllers, and an electrical resistance adapted to be cut in across the switch contacts by the opening of the switch, said electrical resistance being so proportioned as to effect the operation of the lamp when its controlling device is closed without effecting the operation of the starting motor when its controlling device is closed.

In witness whereof I have hereunto set my hand this 10th day of June, 1922.

FRED M. BLAKE.